July 6, 1965 W. G. WADEY 3,193,835

SELF-LOADING TRANSDUCER MOUNTING

Filed June 20, 1961

*INVENTOR.*
WALTER G. WADEY

*BY*

William G. Miller Jr.
AGENT

United States Patent Office 3,193,835
Patented July 6, 1965

3,193,835
SELF-LOADING TRANSDUCER MOUNTING

Walter G. Wadey, Wynnewood, Pa., assignor to Sperry Rand Corporation, New York, N.Y., a corporation of Delaware Filed June 20, 1961, Ser. No. 118,401
11 Claims. (Cl. 346—74)

This invention concerns a recording system in which a record is written on or read from a record medium by a transducer maintained in close proximity to the record medium. More particularly, this invention concerns magnetic recording systems in which the transducer is a magnetic recording head mounted in a member movable toward and away from the surface of the record medium and designed to follow in close and constant spaced relationship with the surface of the record medium.

In the past, there have been utilized magnetic heads mounted in members having surfaces supported and oriented to establish an air bearing between a moving record medium and a member surface thus utilizing the Kingsbury bearing principle to maintain a desired spacing between the member and the medium to prevent contact therebetween. In such arrangements it has heretofore been necessary to provide an element such as a spring to exert a loading force effective to bias the member carrying the magnetic transducer toward the surface of the magnetic medium. In these arrangements this force is counterbalanced by the force produced by the air bearing so that an equilibrium is reached when the head is in close proximity to the surface of the record medium, and this closed spaced relationship is maintained regardless of any uneveness which might normally be present in the surface of the medium. Such arrangements have, however, required complicated mechanisms for lowering the members carrying the transducer to a flying or bearing relationship with the surface of the record medium and for picking the member up away from said surface so that there is no contact between the member and the medium either during start-up or stopping procedures or in the case of power failure. These mechanisms for lifting and lowering the member have in the past been of great importance in view of the expense which might be incurred in replacing the record medium should it be damaged by contact between the moving medium and the stationary member carrying the magnetic transducer.

This invention has for an object, the provision of a self-loading mounting arrangement for a recording transducer.

Another object of this invention is the provision of a mounting for holding a magnetic recording element in closely spaced relationship to the surface of a record medium.

Still another object of this invention is the provision of a recording system in which the shape of the member carrying the transducer establishes a loading force for bringing the transducer into recording relationship with the surface of the record medium.

Another object of this invention is the provision of a transducer carrying member shaped to utilize Bernouilli forces for establishing the transducer in close spaced relationship to a record medium surface.

Still another object of this invention is the provision of a member carrying a magnetic head which member is shaped to utilize the forces established by a high velocity fluid flow adjacent the surface of a record medium moving in close proximity to the member to force the member to close spaced relationship with the medium and to utilize the forces produced by the fluid flow being restricted along the leading edge of the member to balance the other forces and prevent the member from touching the medium.

In carrying out the objects of this invention there is provided a substantially noncompliant record medium and a transducer for producing a record on the record medium in response to signals supplied to the transducer. The transducer is provided with a mounting so arranged as to allow it to move toward the surface of the medium from a rest position sufficiently spaced from the medium surface to prevent contact therewith. This mounting includes a member carrying the transducer. Means are provided for establishing relative motion between the member and the medium so that the transducer scans a portion of the medium and so that there is established with respect to the member a high velocity flow of ambient fluid. The member is provided with surfaces shaped to cause that fluid intercepted by the leading edge of the member to increase in velocity as it flows through the area between the member and the medium so that first forces on the member due to this increase in velocity are produced and are effective to tend to move the member toward the surface of the medium from the rest position. The shape of the member also is such that second forces on the member counterbalancing the first forces are produced when the first forces cause the member to approach in close spaced relationship to the medium. This counterbalancing of the second forces and the first forces prevents contact between the member and the medium and tends to maintain them in close spaced relationship.

The foregoing objects, advantages, construction and operation of the invention will become more readily apparent from the following description in conjunction with the drawings in which.

Figure 1:
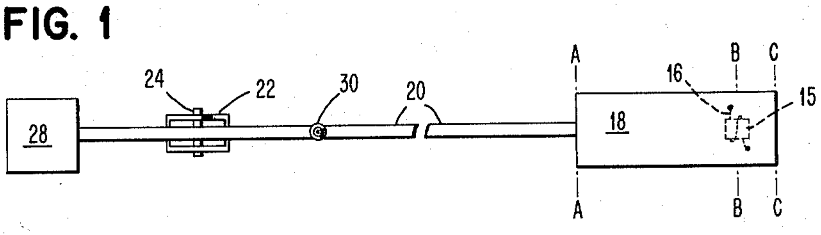
FIGURE 1 is a plan view of one embodiment of the present invention.
Figure 2:
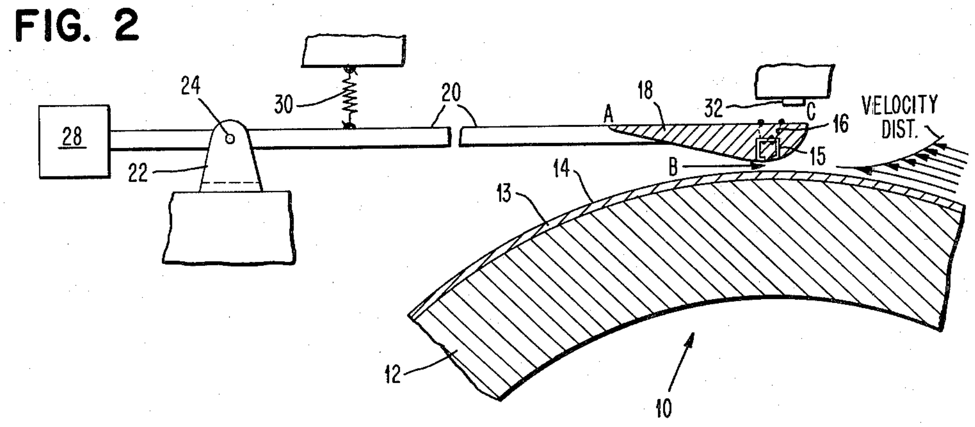
FIGURE 2 is a side view in partial section of FIGURE 1.
Figure 3:
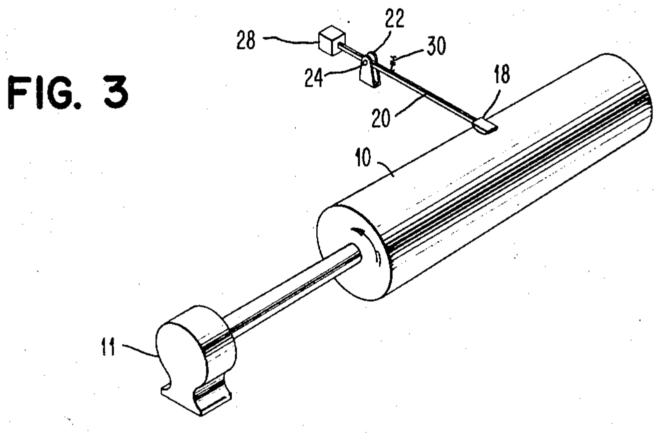
FIGURE 3 is a perspective view of the present invention.

Referring to FIGURES 1, 2 and 3 in which like parts have like reference characters, the invention is shown as being applied to a drum recording system wherein a drum 10 is driven by a motor 11 at a relatively high constant speed. The drum 10 has a base portion 12 which has about its periphery a magnetizable coating or record medium 13 forming an exterior surface 14 for the drum. The recording of information along a peripheral track in the record medium 13 is accomplished by rotating the drum about its axis so that the magnetic transducer 15, which may be of any of a number of suitable magnetic head designs known in the art, moves with respect to the medium 13 at a relatively high constant speed. The magnetic transducer 15 which is shown as having an energizing coil 16 is carried by a mounting consisting of a supporting member 18, shown in FIG. 2 as having a cross-section similar to that of an inverted airplane wing. The member 18 is rigidly fixed to arm 20 which is in turn pivoted in a fixed frame 22 by means of pivots 24. The arm 20 extends beyond the pivots and carries on this extension a counterweight 28 for balancing the weight of member 18 and the magnetic head itself on the opposite side of the pivot 24. The arm 20 is biased by a light spring 30 to provide a force just sufficient to maintain member 18 against stop 32 whenever the drum 10 is not rotating at the desired high speed. Stop 32 is so placed that member 18 will not contact drum 10 regardless of the position of the drum.

The entire apparatus is immersed in an ambient fluid which may be liquid but is preferably a gas such as air. When it is desired to record or reproduce by means of the drum 10 and transducer 15, the drum 10 is accelerated until it reaches a relatively high speed which is then held constant during recording or reproducing operations. As the drum accelerates the increasing velocity of the peripheral surface 14 of record medium 13 is effective to build up a high velocity layer of the ambient fluid, normally air, which would be carried along with the drum surface. The velocity of this fluid layer will generally be inversely related to the distance from the drum surface.

In accordance with this invention the member 18 which carries the transducer 15 is designed so that the surface facing the drum surface, namely between the trailing edge A and the leading edge C has an airfoil shape which may be any of the known shapes used for airplane wings. Such airfoil surfaces may be considered to generally comprise two areas. A first area is between transducer center line B and the leading edge C which is oriented to form an acute angle with the surface of the record medium 13. This acute angle faces, or is open, in a direction opposite to the direction of flow of the gas layer. For the purpose of this description, it will be considered that a supporting member surface forms an acute angle with the surface 14 if the supporting member surface includes areas whose tangents form an acute angle with the surface 14 or its tangents. The surface BC is in the area leading the transducer 15 since the drum 10 is in the present description, rotated in a counterclockwise direction.

The surface AB of the member 18 is also oriented to form an acute angle with the surface 14 as does the surface BC except that this angle is formed between the record surface 14 and the surface AB and trails the transducer and opens out or faces a direction opposite to that of angle formed by the surface BC and the surface 14.

Upon acceleration of the drum 10 to the desired high velocity there is a corresponding increase in the velocity of the ambient fluid in the layer adjacent to the surface 14.

It will be evident that the ambient fluid intercepted by the leading surface BC will flow in the restricted area between member 18 and surface 14 at an increased velocity since a continuous flow must be maintained along the trailing surface AB and away from the trailing edge A. In accordance with the Bernouilli principle the increase in velocity will produce a lowering of the pressure against the surface AB and BC. As a result of the higher pressure which would be present on the opposite side of member 18 namely, the top or second surface in FIG. 2, there will be a resultant force sufficient to overcome the force of spring 30 and move the member 18 toward surface 14. This force will tend to increase in magnitude as the velocity of the ambient fluid past member 18 increases. The member 18 thus acts as an inverted airplane wing.

The positive wedge formed between the surface BC and the surface 14 tends to constrict the fluid flow in the layer and thus causes a momentum transfer from the fluid molecules to the member 18 and causes a pressure build up under the leading portion of the member 18. This effect produces a force tending to move the member 18 away from surface 14.

This force which may be called a wedge force increases at a greater rate as the member 18 approaches the surface 14 because the surface BC is diverting a higher velocity region of the fluid layer and the constriction formed between member 18 and surface 14 is simultaneously being narrowed.

During initial acceleration of drum 10 the Bernouilli force tending to move member 18 away from a rest position against stop 32 will be greater than the wedge force and the member 18 will approach into close spaced relationship to surface 14. As the spacing between the surface 14 and member 18 becomes small the rate at which the wedge force increases becomes greater and the wedge force will eventually counterbalance any Bernouilli forces when the desired closed spaced relationship of member 18 and surface 14 is attained.

This close spaced relationship will be such that the transducer is in such close proximity to the surface 14 that recording and reading of information may be readily carried on without member 18 touching surface 14. This close spacing will normally be maintained essentially constant in spite of small eccentricities in the drum or any minor variations in the diameter of various portions along the drum periphery due to the effect of both the Bernouilli and wedge forces tending to maintain member 18 in an equilibrium position at a constant close spaced relationship to surface 14.

As drum 10 is slowed down during the stopping of the drum, the spring 30 along with the change in the balance of the forces as established will cause the member 18 to pull away from the record medium 13 toward the stop 32 so that no contact will be made between the transducer 15 and the surface 14. Thus, even though there should be a power failure or other unforseen difficulties which might slow down the speed of rotation of the drum 10, no damaging contact will occur between the transducer 15 or member 18 and surface 14.

It will be evident to those skilled in the art that the shape of the surfaces AB and BC of member 18 and their relative areas as well as their relationship to surface 14 may be any of a large number of combinations which are capable of producing the force relationships previously described in accordance with the known principles of fluid dynamics. These area relationships and shapes will, of course, depend to a considerable degree on the velocity of the record medium surface 14, the characteristics of the ambient fluid involved, and the mounting arrangement utilized.

It will also be evident to those skilled in the art that a head mounting incorporating a member such as 18 may be utilized in other common recording arrangements such as disk and tape recording systems as well as in a drum system as here described.

The present invention, however, treats with systems in which the compliant member is that carrying the transducer rather than the record medium itself.

The arrangement shown in FIGURES 1, 2 and 3 is only one specific arrangement which may be utilized and while there is not shown in this arrangement any damping means, it will be evident that various well known damping arrangements may be utilized should the particular structure require them.

Having thus described the invention, what is claimed is:

1. In combination a substantially non-compliant record medium, a transducer for producing a record on said record medium in response to signals supplied to said transducer, means for mounting said transducer to allow said transducer to move toward the surface of said medium from a rest position sufficiently spaced from said medium surface to prevent contact therewith, said mounting means including a member carrying said transducer, said member having an airfoil shaped to provide Bernouilli forces on said member, means providing relative motion between said member and said medium in manner to cause said transducer to scan a portion of said medium and to establish with respect to said member a high velocity flow of ambient fluid, said member having surfaces shaped to cause that fluid intercepted by the leading edge of said member and flowing in the area between said member and said medium during said high velocity flow of ambient fluid to increase in velocity so that first forces on said member due to said increase in velocity are effective to move said member toward the surface of said medium from said rest position, the shape of said member surfaces also being such that second forces on said member counterbalancing said first forces are produced when said first forces cause said member to approach into close spaced relationship to said medium, whereby contact with the surface of said medium is prevented and said transducer is maintained in close spaced relationship to the surface of said medium.

2. In combination a non-compliant record medium, a transducer operable when in close spaced relationship to said record medium to record and read information on said record medium, a member carrying said transducer means for mounting said member to allow motion of said member between a rest position spaced from said medium to prevent contact between said member and said medium and a close spaced relationship allowing recording and reading on said medium, said member having an airfoil shaped to provide Bernouilli forces on said member, means providing relative motion between said member and said medium to establish a flow of ambient fluid past said member, said member having a surface facing said medium, said surface being shaped to establish in response to said fluid flow between said member and said medium a first force tending to move said member from said rest position toward said medium and a second force tending to prevent said member from coming into contact with said medium, said surface shape also being such that said first force is greater than said second force when said member is more distant than the desired close spaced relationship and said second force is greater than said first force when said member is closer to said medium than the desired close spaced relationship.

3. The combination of claim 2 in which a part of said surface forms an acute angle with the surface of said medium, said acute angle opening in a direction opposite to that of said fluid flow.

4. The combination of claim 2 in which said member has a first part forming a first acute angle opening in a direction opposite to that of said fluid flow and a second part forming a second acute angle opening in a direction opposite to that of said first acute angle.

5. In a magnetic recording apparatus a substantially non-compliant record medium, a transducer operable to record on said medium, a member carrying said transducer, means for mounting said member for movement toward and away from said medium, means providing relative motion between said transducer and said medium to establish a fluid flow over said member, said member having an airfoil shaped to provide Bernouilli forces on said member to move it toward said medium as the velocity of said fluid flow increases and a wedge force to prevent contact between said member and said medium and to establish an equilibrium position for said member in close spaced relation to said medium.

6. A system for magnetic recording comprising a record medium, a transducer for recording on said record medium, means for establishing relative motion between said transducer and said medium for creating a high velocity fluid flow over said transducer, said transducer having an airfoil shaped to provide Bernouilli forces on said transducer, said transducer including a surface facing said medium and shaped to form a smooth curve having a contour such that the leading portion of said surface approaches said medium and the trailing portion of said surface recedes from said medium, said surface being effective to cause said transducer to move toward said medium until said transducer establishes a close spaced relationship with said medium and to restrain said transducer from coming into contact with said medium in response to forces established on said surface as said transducer approaches contact with said medium.

7. In a magnetic recording system a drum having a magnetizable surface, means for rotating said drum at a high substantially constant speed, a transducer for recording along a peripheral track on said drum, means for establishing a recording relationship between said transducer and said drum comprising means for mounting said transducer to take a position sufficiently spaced from said drum to prevent contact therewith when said drum is not in motion, said mounting including a shaped member having a first surface facing said drum and a second surface facing away from said drum, said member having an airfoil shaped to provide Bernouilli forces on said member, said first surface being shaped to increase the velocity of the ambient air flowing thereover and carried by the surface of said drum whereby when said member is substantially spaced from said drum the flow of said air over said first surface establishes a force on said member tending to move said member toward said drum, said second surface being shaped to prevent a similar increase in velocity of that portion of the ambient air flowing thereover, said first surface also being shaped to establish forces counterbalancing said forces tending to move member toward said drum as said member approaches in close spaced relationship to said drum surface, whereby said member is established in an equilibrium position in close spaced relationship to the surface of the drum during high speed rotation of said drum for optimum recording by said transducer on said recording surface without contact therebetween.

8. A magnetic recording system as in claim 7 in which said transducer is maintained substantially spaced from the said magnetizable surface by means of a spring.

9. In combination a drum, a magnetizable record medium on the surface of said drum, a transducer operable when in close spaced relationship to said record medium to record and read information on said record medium, member carrying said transducer, said member having an airfoil shaped to provide Bernouilli forces on said member, means for pivotally mounting said member to allow motion of said member toward and away from said drum, a coil spring operable to bias said mounting to keep said member substantially spaced from said record medium when said drum is not in motion to prevent contact between said member and said medium, means for rotating said drum at a high substantially constant speed, said member being so oriented that the flow of ambient air carried by the surface of said drum during rotation at high speeds establishes an increased velocity airflow between said member and said record medium, said high velocity airflow causing a corresponding reduction in pressure in said area between said member and said medium whereby a resultant force on said member is established tending to position said member in closer proximity to said record medium, said member being so shaped along the surface facing said record medium that said airflow establishes a counterbalancing force effective to prevent said member from coming into contact with said record medium and operable in conjunction with said forces tending to bring said member in closer proximity to said record medium to establish a closely spaced equilibrium position for said transducer with respect to said record medium to thereby establish optimum recording relations therebetween and simultaneously to prevent contact therebetween.

10. In combination a record medium, a transducer for producing a record on said record medium in response to signals supplied to said transducer, means for moving said record medium at a substantially high recording speed with respect to said transducer to establish a layer of ambient gas carried by the surface of said medium, means for mounting said transducer in variable spaced relationship with the surface of said record medium, said means for mounting being arranged to allow said transducer to be sufficiently spaced from the surface of said record medium to prevent contact therewith when the said record medium is moving at a slow speed, said transducer mounting including a member carrying said transducer and having a first and second surface area facing said record medium, said member having an airfoil shaped to provide Bernouilli forces on said member, said first surface area being oriented to form with the surface of said record medium an acute angle facing a direction opposite to the direction in which said gas layer is carried by said record medium surface and oriented to lead said transducer, said second surface area being oriented to form with the surface of said record medium an acute angle facing a direction opposite that of said angle formed with said first surface and oriented to trail said transducer, whereby said second surface area in combination with said first surface area reacts to said gas layer in manner to exert a first force on said member tending to bring said transducer in closer proximity to the surface of said medium when said recording medium is moved at a high speed for recording and said first surface area reacts to said gas layer in manner to exert a second force opposing said first force and effective to balance said first force when said transducer is in close recording relationship to said record medium.

11. In combination a record medium, a transducer for producing a record on said record medium in response to signals supplied to said transducer, means for moving said record medium at a substantially high recording speed with respect to said transducer to establish a layer of ambient gas carried by the surface of said medium, means for mounting said transducer in variable spaced relationship with the surface of said record medium, said means for mounting being arranged to allow said transducer to be sufficiently spaced from the surface of said record medium to prevent contact therewith when the said record medium is moving at a slow speed, said transducer mounting including a member carrying said transducer and having a first and second surface area facing said record medium, said member having an airfoil shaped to provide Bernouilli forces on said member, said first surface area being oriented to form with the surface of said record medium an acute angle facing a direction opposite to the direction in which said gas layer is carried by said record medium surface and oriented to lead said transducer, said second surface area being oriented to form with the surface of said record medium an acute angle facing a direction opposite that of said angle formed with said first surface and oriented to trail said transducer, whereby said second surface area in combination with said first surface area reacts to said gas layer in manner to exert a first force on said member tending to bring said transducer in closer proximity to the surface of said medium when said recording medium is moved at a high speed for recording and said first surface area reacts to said gas layer in manner to exert a second force opposing said first force and effective to balance said first force when said transducer is in close recording relationship to said record medium.

References Cited by the Examiner

UNITED STATES PATENTS

| | | | |
|---|---|---|---|
| 2,772,135 | 11/56 | Hollabaugh et al. | 179—100.28 |
| 2,862,781 | 12/58 | Baumeister | 179—100.2 |
| 2,950,353 | 8/60 | Fomenko | 179—100.2 |
| 2,972,738 | 2/61 | Sliter | 179—100.2 |

FOREIGN PATENTS

| | | |
|---|---|---|
| 210,582 | 10/57 | Australia. |

IRVING L. SRAGOW, *Primary Examiner.*

ELI J. SAX, *Examiner.*